United States Patent

[11] 3,614,412

[72] Inventor Alfred H. Bellows
   Cambridge, Mass.
[21] Appl. No. 807,537
[22] Filed Mar. 17, 1969
[45] Patented Oct. 19, 1971
[73] Assignee Polaroid Corporation
   Cambridge, Mass.

[54] PHOTOFLASH LAMP ASSEMBLY
   4 Claims, 4 Drawing Figs.
[52] U.S. Cl. .................................................. 240/1.3,
                                                   240/103
[51] Int. Cl. ............................................... G03b 15/02
[50] Field of Search .......................................... 240/1.3, 37,
       37.1, 103; 95/11, 11.5; 431/92, 93, 94, 95

[56]                References Cited
             UNITED STATES PATENTS
3,267,272  8/1966  Fischer ........................  240/1.3
3,473,880  10/1969 Wick ...........................  431/95
             FOREIGN PATENTS
6,616,822  2/1967  Netherlands .................  240/1.3

Primary Examiner—Samuel S. Matthews
Assistant Examiner—Fred L. Braun
Attorneys—Brown and Mikulka, James L. Neal and William D. Roberson ABSTRACT: A photoflash lamp assembly electrically connectable to a photoflash lamp ignition circuit includes first and second arrays of concave light reflectors arranged in nested back-to-back relationship to face in opposite directions. Each array includes at least two parallel rows of reflectors arranged in staggered interdigitated relationship. A plurality of photoflash lamps are mounted one in each of the reflectors.

INVENTOR.
ALFRED H. BELLOWS
BY
Brown and Mikulka
and
James L. Neal
ATTORNEYS

PHOTOFLASH LAMP ASSEMBLY

SUMMARY OF THE INVENTION

The invention involves a multilamp photoflash assembly usable with an electrical circuit for discharging photoflash lamps connected therein.

The advent of small photoflash lamps has made possible various photoflash lamp assemblies containing a plurality of flash lamps for selective ignition in synchronism with an exposure-producing operation of a photographic camera. This invention provides a compact assembly including individual reflectors for supporting plurality of photoflash lamps, one lamp being supported in each reflector. The assembly defines a pair of oppositely directed light-reflecting arrays each comprising more than one row of individual concave reflectors. The concave reflectors of each row define narrowed or tapered portions adjacent the contiguous row or rows in the same array. The narrow or tapered portion of the reflectors in one row are staggered and interdigitated with respect to the narrow or tapered portions of the reflectors in the adjacent row of the same array. That is to say, the space formed by the tapering of he reflectors in any one row is occupied by the tapered portion of a reflector in the continuous row. Since the individual reflectors are concave, the reverse side of the arrays form spaces into which oppositely directed individual light reflectors of the opposed array may be nested to produce a back-to-back, oppositely directed relationship of the two arrays. Thus nested, significant compaction is achieved yielding a thickness dimension for two arrays which is substantially the same as that required for one array.

The assembly of this invention provides three-dimensional compaction to minimize the volume required to contain a given number of photoflash lamps and individual reflectors. The three-dimensional compaction is achieved by interdigitating the reflectors of each row with the reflectors of an adjacent row in the same array and by nesting the arrays in oppositely facing back-to-back relationship.

It is a primary object of this invention to provide a compact multilamp photoflash assembly usable with means for discharging photoflash lamps in synchronism with photographic exposures.

It is a further object of this invention to provide a multilamp photoflash assembly including opposed arrays of concave light reflectors in nested, back-to-back relationship wherein each array defines several rows of individual reflectors, the reflectors of any one row being staggered and interdigitated with respect to the reflectors in an adjacent row of the same array.

DETAILED DESCRIPTION OF THE DRAWINGS

Figure 1:
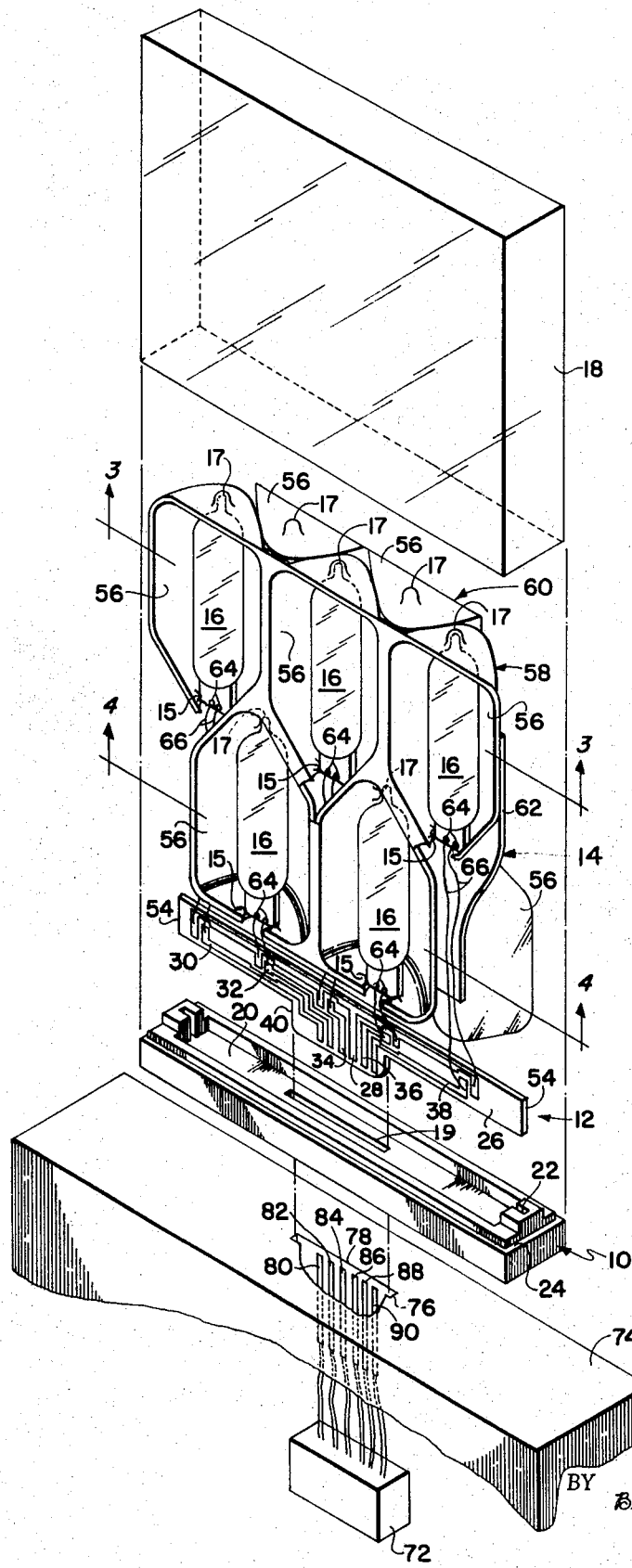
FIG. 1 is an exploded perspective view showing a preferred embodiment of this invention.
Figure 4:
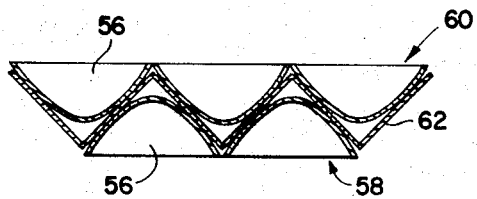
FIG. 4 is a cross-sectional view taken along line 4—4 of FIG. 1.
Figure 3:
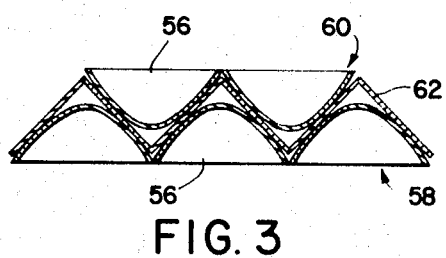
FIG. 3 is a cross-sectional view taken along line 3—3 of FIG. 1.
Figure 2:
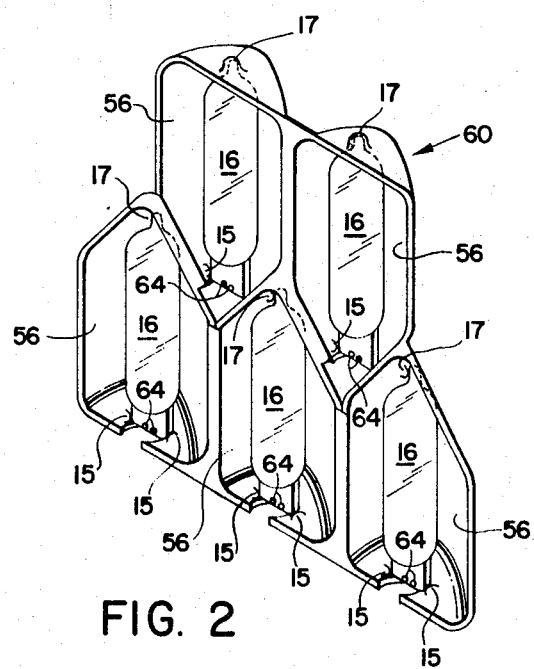
FIG. 2 is a perspective view showing an element of the apparatus shown in FIG. 1.

The multilamp photoflash assembly of this invention comprises base 10, conducting means 12, means 14 forming opposing light-reflecting arrays, means 15 and 17 for supporting a plurality of photoflash lamps 16 and transparent housing 18.

Base 10 comprises slot 19, through which a portion of conducting means 12 extends, recession 20, slots 22, and peripheral shoulder 24.

Conducting means 12 comprises a relatively rigid electrically nonconductive member 26 supporting electrically conductive strips 28, 30, 32, 34, 36, and 38 on each side thereof and defining a downwardly extending extremity 40 to which is applied a terminal end portion of each of the electrically conducting strips. Insulating means 26 further includes ends 54 which are receivable by slots 22, conducting means 12 being firmly retained in the base by means of these ends and slots 22. Extremity 40, having terminal ends of electrically conducting strips 28, 30, 32, 34, 36, and 38 applied to each side thereof, extends through slot 19 and protrudes from the bottom of base 10.

Means 14 forms first and second arrays of concave light reflectors designated 58 and 60. Each array comprises two parallel rows of individual concave reflectors 56. Base 10 is contiguous one row of reflectors in each array for supporting the arrays. The row in array 58 adjacent base 10 comprises a number of concave reflectors each having a tapered portion contiguous the reflectors of a second row remote from base 10. The reflectors of the second row have tapered portions contiguous the reflectors of the first row. The tapered portions of the reflectors of each of the rows are staggered and interdigitated with respect to the tapered portions of the reflectors of the adjacent row so that the space formed between tapered portions of adjacent reflectors to one row is filled by the tapered portion of a reflector of the other row. In this manner an assembly having two rows of reflectors, one above the other in the direction normal to the base is compacted so that the dimension normal to the base is less than twice the dimension of the individual reflectors along a line normal to the base. In the preferred embodiment, the assembly contains 10 lamps 16 and 10 individual reflectors 56. Accordingly, array 58 includes a lower row comprising two reflectors and an upper row comprising three reflectors. Array 60 is similar to array 58 and includes a lower row comprising three individual reflectors and an upper row comprises two individual reflectors.

The reflectors of each array may be individually separate and distinct or their construction may be unitized. In the preferred embodiment each off the opposed light-reflecting arrays 58 and 60 are unitized. Unitized light-reflecting arrays may be vacuum-formed from a single sheet according to practice known in the art. Unitized light reflectors forming light-reflecting arrays 58 and 60 are positioned back to back so that the row in array 58 containing three reflectors is back to back to the row in array 60 containing two reflectors. Similarly, the row in array 58 containing two reflectors is back to back to the row in array 60 containing three reflectors. The reflectors in arrays 58 and 60 are staggered and interdigitated so that the reflector of one array fills a spaced formed between reflectors of the opposing array thereby achieving compaction in assembly thickness (i.e., the dimension substantially normal to the optical axis of the reflectors).

In the preferred embodiment, a thermally insulating sheet 62 is provided between the arrays to inhibit heat transfer between reflectors occurring when a photoflash lamp s discharged. In applications wherein sheet 62 or the like, is not necessary, the nested back to back arrays of reflectors may be formed of a single sheet with concavities in an obverse side forming reflectors 56 of array 58 and concavities in a reverse side forming reflectors 56 of array 60.

The individual reflectors 56 each receive an elongated photoflash lamp 16. The lamps are mounted in the reflectors by base-engaging configurations 15 and tip-engaging configurations 17. Each lamp includes terminal means 64 and lead wires 66. The lead wires connect one terminal of each lamp received by individual reflectors 56 of array 58 to the conducting strip 28 on one side of electrically nonconductive member 26. One terminal of each lamp received by individual reflectors 56 of array 60 is similarly connected to the conducting strip 28 on the other side of member 28. The remaining terminal of each lamp in arrays 58 and 60 are connected to one of the other conducting strips on the aforesaid one and other sides, respectively, of electrically nonconductive member 26.

Transparent housing 18 fits over oppositely directed arrays 58 and 60 and flashlamps 16 and is secured, by adhesive or the like, to shoulder 24 of base 10. Housing 18 holds arrays 58 and 60 in assembled position and also assists lamp-mounting means 15 and 17 by stabilizing lamps 16 in reflectors 56.

Housing 18 also serves as a safety shield for the assembly; it may be tinted to enhance the photographic quality of light produced by the assembly.

The photoflash lamp assembly of this invention is usable with photoflash lamp ignition circuit means 72. The circuit means may be housed within camera body 74 having slot 76 and flattened surface 78. Circuit means 72 includes a number of resilient spring contacts 80, 82, 84, 86, 88, and 90 opposite surface 78 for electrical connection with conducting means 12 and for gripping extremity 40 between their contacting surfaces and surface 78 to hold the assembly upon camera body 74.

Contacts 80, 82, 84, 86, 88 and 90 are arranged for engagement with one side only of extremity 40. In this manner the contacts press one side of the extremity firmly against surface 78 so that the photoflash lamp assembly is frictionally held in place while electrical connection is established with the terminal ends of conducting strips 28, 30, 32, 34, 36, and 38 on the opposite side of the extremity by contacts 80, 82, 84, 86, 88, and 90, respectively.

Photoflash lamp ignition circuit means 72 provides a source of electrical energization for selectively energizing photoflash lamps 16 in time relationship to the production of photographic exposures. Means 72 may be of a suitable type, of which many are known in the art. For example, an electrical connection may be established between source of electrical energization 72 and common conducting strip 28 associated with the lamps in a selected array. Conducting strips 30, 32, 34, 36, and 38, one associated with each lamp in the selected array, may then be connected to the source of electrical energization one at a time in sequence for discharging the lamps one at a time in sequence.

When all the lamps of the first selected array have been discharged, the photoflash lamp assembly is drawn from slot 76, turned around and again inserted into slot 76. Electrical connection is thus established between the lamps of the second selected array and the source of electrical energization to permit selective discharge of these lamps.

Since certain changes may be made in the above apparatus without departing from the scope of the invention herein involved, it is intended that all matter contained in the above description or shown in the accompanying drawing shall be interpreted as illustrative and not in a limiting sense.

I claim:
1. A photoflash lamp assembly electrically connectable to a photoflash lamp ignition circuit comprising:
   a. means defining a first and second array of concave light reflectors arranged in nested back to back relationship to face in opposite directions, each array including at least two parallel rows of reflectors arranged in staggered interdigitated relationship;
   b. means for mounting a plurality of photoflash lamps each in a respective one of said reflectors:
   c. a base adjacent one row of mutually nested ones to said corresponding reflectors of said first and second array; and
   d. terminal means for connecting said lamps selectively through said base to a source of electrical energization.

2. A photoflash lamp assembly according to claim 1 wherein at least one of said arrays includes one row of reflectors comprising one less reflector than an adjacent row of reflectors.

3. A photoflash lamp assembly according to claim 1 wherein each of said arrays includes one row of reflectors comprising a number of reflectors and an adjacent row of reflectors comprising one less than said number of reflectors.

4. A photoflash lamp assembly according to claim 3 wherein said arrays are arranged so that said row comprising said number of reflectors in one array is back to back with said row comprising one less than said number of reflectors in the other array and said row comprising on less than said number of reflectors in said one array is back to back with said row comprising said number of reflectors in said other array said back to back rows of reflectors being in nested relationship.